(12) United States Patent
Friedrich et al.

(10) Patent No.: US 11,149,794 B2
(45) Date of Patent: Oct. 19, 2021

(54) BEARING CAGE SEGMENT OF A SHEET METAL CAGE

(71) Applicant: AKTIEBOLAGET SKF, Gothenburg (SE)

(72) Inventors: Hans-Juergen Friedrich, Königsberg-Römershofen (DE);
Norbert Huhn, Schweinfurt (DE);
Thomas Kettner, Bamberg (DE);
Manfred Mattes, Kolbingen (DE);
Harald Metz, Randersacker (DE);
Achim Mueller, Dittelbrunn (DE);
Alfred Radina, Poppenlauer (DE);
Jonas Schierling, Hassfurt (DE);
Maximilian Soellner, Bundorf (DE);
Markus Volkmuth, Werneck-Zeuzleben (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 16/778,350

(22) Filed: Jan. 31, 2020

(65) Prior Publication Data
US 2020/0256390 A1    Aug. 13, 2020

(30) Foreign Application Priority Data
Feb. 7, 2019   (DE) .......................... 102019201561.1

(51) Int. Cl.
*F16C 33/54*    (2006.01)
(52) U.S. Cl.
CPC .......... *F16C 33/542* (2013.01); *F16C 33/545* (2013.01); *F16C 2220/82* (2013.01)

(58) Field of Classification Search
CPC .... F16C 33/46; F16C 33/4641; F16C 33/504; F16C 33/54; F16C 33/541; F16C 33/542;
(Continued)

(56) References Cited

U.S. PATENT DOCUMENTS

| 2,269,224 A | 1/1942 | Reilly |
| 2,591,160 A | 4/1952 | Kilian |

(Continued)

FOREIGN PATENT DOCUMENTS

| CN | 103415717 A | 11/2013 |
| CN | 104475350 A | 4/2015 |

(Continued)

OTHER PUBLICATIONS

LaserJob, Inc., Laser Material Processing, Oct. 2012, p. 2 (Year: 2012).*
Translation of DE102009017751 obtained Feb. 12, 2021.*

*Primary Examiner* — James Pilkington
(74) *Attorney, Agent, or Firm* — J-Tek Law PLLC; Scott T. Wakeman; Mark A. Ussai (57) ABSTRACT

A sheet metal bearing cage segment includes a first sheet metal ring section, at least one second sheet metal ring section, and a plurality of bridges connecting the first ring section and the at least one second ring section to each other, adjacent pairs of the bridges forming pockets configured to receive at least one rolling element. At least one edge of the first ring section and/or at least one edge of the at least one second ring section and/or of one of the bridges is at least partially formed by laser cutting. Also a method of forming a sheet metal bearing cage at least partially by laser cutting.

12 Claims, 5 Drawing Sheets

(58) Field of Classification Search
CPC .... F16C 33/543; F16C 33/545; F16C 33/547; F16C 33/502
USPC .................................................. 29/898.067
See application file for complete search history.

(56) References Cited

U.S. PATENT DOCUMENTS

| | | | |
|---|---|---|---|
| 3,313,582 A | 4/1967 | Henry | |
| 3,353,246 A | 11/1967 | Farmer | |
| 3,356,428 A | 12/1967 | Ralph | |
| 3,473,857 A | 10/1969 | Pitner | |
| 3,902,772 A | 9/1975 | Spate | |
| 4,397,507 A | 8/1983 | Kraus et al. | |
| 4,577,088 A | 3/1986 | Sharp | |
| 4,821,386 A | 4/1989 | Simon et al. | |
| 5,187,345 A | 2/1993 | Alling et al. | |
| 5,255,985 A | 10/1993 | Alling | |
| 5,528,706 A | 6/1996 | Harimoto et al. | |
| 6,330,748 B1 | 12/2001 | Müntnich et al. | |
| 6,752,535 B2 * | 6/2004 | Krochak | F16C 19/30 384/623 |
| 6,883,968 B2 | 4/2005 | Fugel et al. | |
| 7,571,706 B2 * | 8/2009 | Ichikawa | B21D 53/12 123/197.3 |
| 8,696,210 B2 | 4/2014 | Kawai et al. | |
| 8,770,854 B2 | 7/2014 | Friedrich et al. | |
| 9,239,077 B2 | 1/2016 | Doki-Thonon et al. | |
| 9,382,947 B2 | 7/2016 | Ishibashi | |
| 9,429,194 B2 | 8/2016 | Reimchen | |
| 9,512,881 B2 | 12/2016 | Katayama et al. | |
| 9,551,377 B2 | 1/2017 | Haas et al. | |
| 2007/0248298 A1 | 10/2007 | Chihara | |
| 2013/0034321 A1 | 2/2013 | Beck et al. | |
| 2013/0308890 A1 | 11/2013 | Steblau | |
| 2016/0017919 A1 | 1/2016 | Haas et al. | |

FOREIGN PATENT DOCUMENTS

| | | |
|---|---|---|
| CN | 104847794 A | 8/2015 |
| CN | 104847795 A | 8/2015 |
| CN | 105605100 A | 5/2016 |
| CN | 106271725 A | 1/2017 |
| CN | 206215979 U | 6/2017 |
| CN | 107120357 A | 9/2017 |
| DE | 3130610 A1 | 2/1983 |
| DE | 19910928 A1 | 9/2000 |
| DE | 10065169 A1 | 7/2002 |
| DE | 102006045436 A1 | 3/2008 |
| DE | 102009017751 | * 10/2010 |
| DE | 102016201052 A1 | 7/2017 |
| DE | 102016222336 A1 | 5/2018 |
| EP | 3074803 A1 | 3/1983 |
| EP | 2839175 B1 | 5/2016 |
| FR | 2514440 A1 | 4/1983 |
| FR | 2612102 A1 | 9/1988 |
| FR | 3013087 A1 | 5/2015 |
| GB | 2103307 A | 2/1983 |
| JP | H0742744 A | 2/1995 |
| JP | 07317773 A | 12/1995 |
| JP | 2006064044 A | 3/2006 |
| JP | 2007247856 A | 9/2007 |
| JP | 4786124 B2 | 10/2011 |
| JP | 2013007435 A | 1/2013 |
| JP | 2013108587 A | 6/2013 |
| JP | 2017026083 A | 2/2017 |
| JP | 6197844 B2 | 9/2017 |
| WO | 2008040290 A1 | 4/2008 |
| WO | 2014136816 A1 | 9/2014 |
| WO | 2015022355 A1 | 2/2015 |
| WO | 2018109784 A1 | 6/2018 |

* cited by examiner

BEARING CAGE SEGMENT OF A SHEET METAL CAGE

CROSS-REFERENCE

This application claims priority to German patent application no. 10 2019 201 561.1 filed on Feb. 7, 2019, the contents of which are fully incorporated herein by reference.

TECHNOLOGICAL FIELD

The present disclosure is directed to a bearing cage segment of a sheet metal cage and a sheet metal cage including at least such a bearing cage segment, and a method for manufacturing such a bearing cage segment.

BACKGROUND

Bearing cages are known from the prior art that are composed of one or more rounded cage segments, made of metal sheet, that are respectively connected to one another at their joint edges, for example by welding.

Here it is known to produce the structure and contour of such bearing cage segments by punching and stamping. For this purpose in a first step a metal band is intermittently moved along in the longitudinal direction, wherein transversely extending slots are formed by a punch press. In a further step the metal band is cut to length using a transverse cutting device so that a ladder-shaped sheet metal part is formed, wherein the "rungs" of this part form bridges of the bearing cage segment, the slots of the part form pockets of the bearing cage segment, and the "side rails" of the part form the ring sections of the bearing cage segment. In a subsequent step the ring sections are then bent to a desired radius of curvature by round molds. Of course, still further steps can be carried out for manufacturing the bearing cage segment, for example, a compression molding.

Accordingly to manufacture a bearing cage segment having certain pocket dimensions and certain pocket distances, a corresponding set of punching and stamping tools is required so that, in particular in the case of small quantities, the manufacturing can be uneconomical.

SUMMARY

It is therefore an aspect of the present disclosure to provide a bearing cage segment for a needle roller bearing that can be manufactured at reduced expense.

In the following a bearing cage segment of a sheet metal cage, in particular for a needle roller bearing, is provided, which includes a first ring section, at least one second ring section, and a plurality of bridges connecting the first ring section and the at least one second ring section to each other, wherein a pocket for receiving at least one rolling element is respectively formed between the bridges. Here the disclosure is based on the idea that at least partially at least one edge of the first ring section and/or of the least one second ring section and/or one of the bridges is formed by laser cutting.

Here the bearing cage segment can be configured for single-row or multi-row bearing cages.

With the aid of laser cutting, arbitrarily shaped bearing cage segments can be manufactured without great expense in terms of manufacturing technology. Here the individual dimensions of the bearing cage segments can be obtained via a simple software controlling (programming). The individual manufacture of punching tools that are adapted to the respective cage can thus be avoided. Even small quantities of bearing cages are thereby more economical.

In addition, with the aid of laser cutting the bearing cage segment can be formed from a metal sheet, for example, in the form of a sheet metal plate, wherein not only a single, but also many bearing cage segments can be manufactured from the metal sheet, which bearing cage segments can furthermore differ in their dimensions.

In addition, a particularly precisely shaped edge of the bearing cage segment can be formed by laser cutting, so that, in comparison to a punched edge, a, for example, machining post-processing step can generally be omitted. In this way the manufacturing is simplified.

According to one exemplary embodiment the edge forms at least a part of an outer contour of the bearing cage segment. Due to the laser cutting the outer contour can be individually shaped particularly easily so that different bearing cage widths can be manufactured with one and the same tool and from a metal sheet of one size.

If the bearing cage segment or the plurality of bearing cage segments are to be manufactured from a large-area metal sheet, then a laser cutting device can be relatively easily designed to be movable relative to the metal sheet. In addition, forces acting normal to the plane of the metal sheet, as is the case with a punching process, that could lead to an undesirable deforming of the cage edges, do not arise here.

However, according to a further advantageous exemplary embodiment, the at least one pocket can be formed by punching, since the at least one pocket can be formed in this way in a particularly brief processing step. The above-mentioned problems during punching recede into the background due to the smaller size of the pockets in comparison to the outer contour of the bearing cage segment. In addition, the pocket can still be subjected to further reshaping processes/post-processing processes, such as, for example, a stamping to develop special structures such as, for example, guide surfaces for the rolling elements, so that any inaccuracies or bendings during punching are irrelevant.

According to one exemplary embodiment, the laser-cut edge of the bearing cage segment is a joint edge directed in the circumferential direction, which joint edge is disposed in the region of a pocket or in the region of a bridge. Due to the laser cutting, this edge can be so precisely shaped that, as is explained below, a post-processing for a suitability as a welding surface can be omitted.

In the conventional manufacturing of a bearing cage from a metal sheet pre-shaped to the width of the bearing cage segment, the metal sheet is cut to size with a transverse cutting device to its corresponding length (circumference). This cutting-to-size typically occurs at a location that lies within or in the region of a pocket. In this way two free end regions of the ring sections are formed, between which a "partial pocket" is formed. However, due to the cutting-to-size of the metal sheet, ring-section edges formed by the cutting-to-size of the metal sheet and directed in the circumferential direction are insufficiently dimensionally stable due to the cutting-to-size to serve as a welding surface. Thus a post-processing is required here that is necessarily associated with a material removal. Therefore if after the curving of the bearing cage segment the post-processed joint edges were to simply be welded to the corresponding joint edges opposing in the circumferential direction, then at this connecting point a "welding pocket" would be formed which, viewed in the circumferential direction, would have a smaller width than the other pockets. For this reason, according to the prior art the free end regions of the ring sections are first shortened to somewhat less than a complete pocket width and only then post-processed, so that with respect to the desired pocket width they have the correct length for connecting to the opposing joint edges. Accordingly, in addition to the additional effort of the post-processing, significant material loss also occurs here. However, if the joint edge is laser-cut, both this effort and the material loss mentioned can be avoided. In this way the efficiency of the manufacturing is improved. The same also applies with an arrangement of the joint edge in the region of the bridge. Therefore according to an alternative preferred exemplary embodiment, the laser-cut edge of the bearing cage segment forms a joint edge directed in the circumferential direction, which joint edge is disposed in the region of a bridge. The arrangement of the joint edge in the region of the bridge also has the further advantage that it is particularly stable, since a connection is generally more stable the larger the connecting surface.

According to a further exemplary embodiment, the bearing cage segment includes an end region at each of its circumferential ends, wherein at least one of the end regions is pre-bent to a radius of curvature of the sheet metal cage. If, for forming the bearing cage, the bearing cage segment is bent out from a plane to the radius of curvature of the finished cage, the circumferential end regions can generally be bent less easily than a central region of the bearing cage segment, in particular since the lever arms are shorter here. However, if at least one end region of the bearing cage segment is already pre-bent to the radius of curvature of the needle-roller-bearing cage, the bending into the desired shape is therefore made easier.

The end region to be pre-bent to the radius of curvature can preferably be manufactured by a stamping that can advantageously be carried out in a time-saving manner and with sufficient accuracy.

According to a further exemplary embodiment, the bridges and/or the first ring section and/or the at least one second ring section have structures formed by stamping and/or rolling. Thus, for example, guide surfaces for guiding a rolling element can be formed.

According to a further preferred exemplary embodiment, the bearing cage segment is cut out from a metal sheet. Thus for further processes, such as, for example, the above-mentioned bending, stamping, or punching, the bearing cage segment can further have a defined position; a micro-connection point can be provided on the outer contour that fixes the bearing cage segment to the metal sheet, but can be easily separated, in particular by hand. On the individual bearing cage segment, micro-connection points can therefore be provided that are preferably disposed on the axially outer edge of the first ring section and on the axially outer edge of the at least one second ring section. In particular, two such micro-connection points can be provided, a first on the axially outer edge of the first ring section, and a second on the axially outer edge of the at least one second ring section. As mentioned above, in a later step the bearing cage segment can then be separated from the metal sheet by the micro-connection points being easily broken-through, in particular by hand. Here the micro-connection points are preferably configured so small that a post-processing of the micro-connection points is not absolutely required.

According to a further aspect of the disclosure a sheet metal cage is provided for a needle roller bearing that includes at least one of the above-described bearing cage segments. The sheet metal cage can be configured single-row or multi-row.

It is advantageous here if the joint edges of the at least one bearing cage segment, which joint edges are directed in the circumferential direction, or the joint edges of two adjacent bearing cage segments are connected via a material-bonded, interference-fit, or friction-fit connection. Since particularly precise joint edges can be produced by laser cutting, it is particularly advantageous if the connection is a material-bonded connection, in particular a weld connection.

If the joint edge is formed in the region of a pocket, a so-called "welding pocket" is formed at the point of the weld connection. If the joint edge is formed in the region of a bridge, a so-called "welding bridge" is formed at the point of the weld connection.

According to a further aspect of the disclosure a method for manufacturing a bearing cage segment for a needle-bearing cage according to the application is provided, including the following steps: a) providing a metal sheet and b) forming one or more bearing cage segments from the metal sheet, wherein in at least one of the bearing cage segments at least one edge of the first ring section and/or of the at least one second ring section and/or of one of the bridges is at least partially formed by laser cutting. The above-described advantages arise here in an analogous manner.

According to one exemplary embodiment, the method also includes the following step: c) stamping and/or rolling the first ring section and/or the at least one second ring section and/or at least one of the bridges. By such a stamping or rolling, guide surfaces, for example, for guiding the rolling elements can be formed.

According to one exemplary embodiment, in a step d) the bearing cage segment is bent round (curved into an arc) at its circumferential ends to a radius of curvature of the sheet metal cage. Thus the two above-mentioned pre-bent end regions can be obtained. This round-bending can be provided here when the bearing cage segment is still connected to the rest of the metal sheet via the micro-connection points. Here the entire metal sheet can be bent. In this way it can be achieved that the round-bending can be carried out simultaneously with a corresponding round-bending of at least one optionally provided further bearing cage segment. Alternatively the bearing cage segments can be individually bent.

Furthermore it is advantageous if the bearing cage segment is released from the rest of the metal sheet in a step e) by breaking the micro-connection points via which the bearing cage segment is connected to the rest of the metal sheet after step b). The micro-connection points are preferably configured such that, after the releasing, the respective points on the bearing cage segment no longer need to be post-processed. The "breaking out" can be carried out by machine or by hand.

According to a further exemplary embodiment a sheet metal cage is manufactured from at least one bearing cage segment manufactured as described above, and specifically by the following step f): welding a joint edge of the bearing cage segment, which joint edge is directed in the circumferential direction, to a further joint edge of the bearing cage segment or to a joint edge of a further bearing cage segment. This is particularly advantageous if the respective joint edges are laser-cut.

A further exemplary embodiment is a method that involves punching a plurality of openings in a metal sheet, and, after punching the plurality of openings, laser cutting a first path around a first subset of the plurality of openings to form an outer periphery of a first bearing cage segment. The periphery may be rectangular. The first subset of the plurality of openings forms pockets of the first bearing cage segment. The outer periphery may include a first linear section that forms an outer edge of a first ring of the bearing cage segment and a second linear section that forms an outer edge of a second ring of the bearing cage segment, the second linear section being parallel to the first linear section. The method may also include cutting a second path around a second subset of the plurality of openings to form a periphery of a second bearing cage segment, the second subset of the plurality of openings forming pockets of the second bearing cage segment.

Further advantages and advantageous embodiments are specified in the description, the drawings, and the claims. Here in particular the combinations of features specified in the description and in the drawings are purely exemplary, so that the features can also be present individually or combined in other ways.

In the following the disclosure shall be described in more detail using exemplary embodiments depicted in the drawings. Here the exemplary embodiments and the combinations shown in the exemplary embodiments are purely exemplary and are not intended to define the scope of the invention. This scope is defined solely by the pending claims.

DETAILED DESCRIPTION

In the following, identical or functionally equivalent elements are designated by the same reference numbers. The direction designations used in the following—axial, radial, circumferential—always refer to the finished bearing cage.

Figure 1:
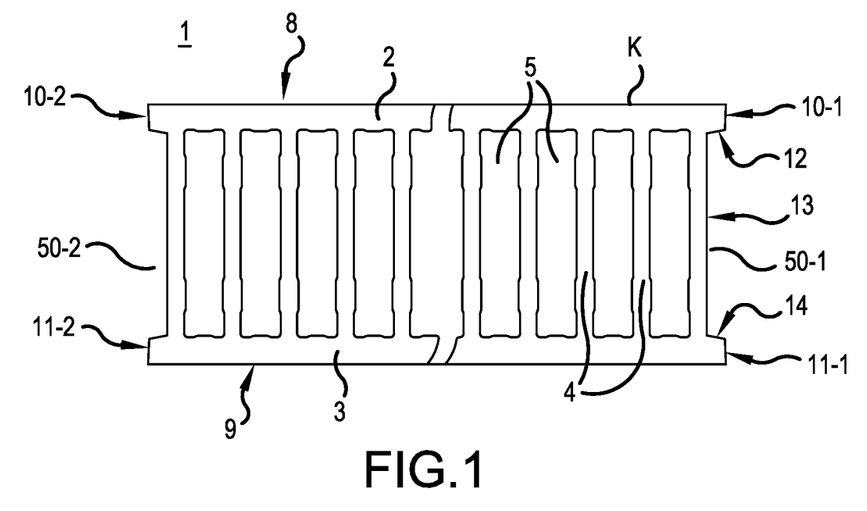
FIG. 1 is a schematic depiction of a first preferred exemplary embodiment of a bearing cage segment.

FIG. 1 shows a schematic representation of a first exemplary embodiment of a bearing cage segment 1. The bearing cage segment 1 includes a first ring section 2, a second ring section 3, and a plurality of bridges 4 connecting the first ring section 2 and the second ring section 3 to each other, wherein pockets 5 for receiving rolling elements (not depicted) are formed between the bridges 4. Such a bearing cage segment 1 can be manufactured, for example, from a large-area metal sheet and is suitable in particular for a needle roller bearing. Instead of the single-row design of the bearing cage segment 1 depicted here, the bearing cage segment 1 can also be configured multi-row, and would then include a first, a second, and further ring sections that are each connected to each other by bridges.

As schematically indicated by thick lines in FIG. 1, the outer contour K of the bearing cage segment is formed by laser cutting. Here this outer contour comprises, inter alia, an axially outer edge 8 of the first ring section 2 and an axially outer edge 9 of the second ring section 3.

In the depicted exemplary embodiment the outer contour K further respectively comprises joint edges 10-1, 10-2 of the first ring section 2, which joint edges 10-1, 10-2 are directed in the circumferential direction, and are either joined together or to a further joint edge of a further bearing cage segment via a connection, for example, a weld connection, in order to form the finished bearing cage. The second ring region 3 includes corresponding joint edges 11-1, 11-2.

In the embodiment sketched in FIG. 1 the joint edges 10, 11 are provided in the region of a to-be-formed pocket, that is, of a so-called welding pocket. This to-be-formed pocket thus includes a first "partial pocket" 50-1 and a second partial pocket 50-2 that in the assembled state the has the same dimensions as the other pockets 5. The partial pocket 50-1 itself comprises a bridge edge 13, an axially inner-edge section 12 of the first ring section 2, and an axially inner-edge section 14 of the second ring section 3. This contour of the partial pocket 50-1 is preferably also laser-cut. The partial pocket 50-2 can be configured analogously.

Figure 2:
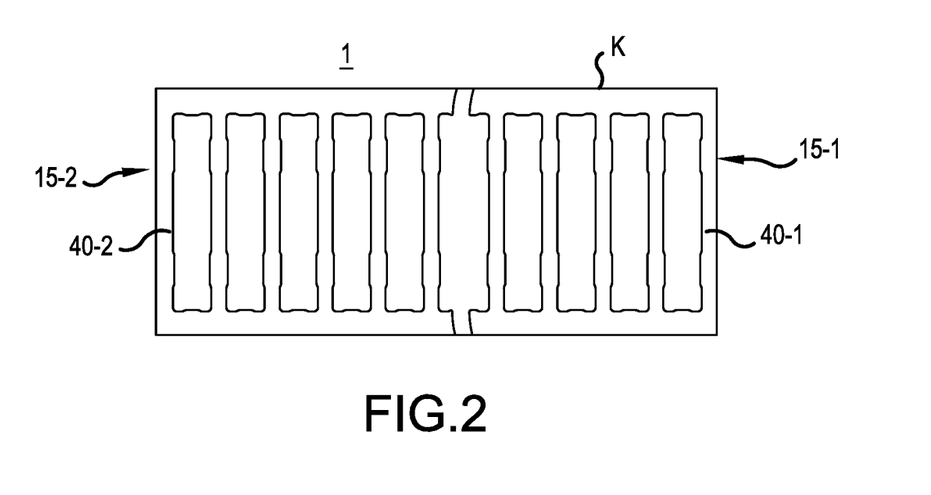
FIG. 2 is a schematic representation of a second exemplary embodiment of a bearing cage segment.

As sketched in FIG. 2, according to an alternative exemplary embodiment a joint edge, here provided with the reference numeral 15-1, can be disposed in the region of a bridge or of a to-be-formed bridge, so that in this case a "partial bridge" 40-1 is formed. This joint edge 15-1 forms, so to speak, a "partial-bridge joint edge." Due to this design a joint edge can be obtained that is significantly larger than the joint edges 10-1, 11-1 shown in FIG. 1, whereby a particularly stable connection can be achieved.

Analogously the bearing cage segment 1 of FIG. 2 includes a partial bridge 40-2 on its other side, wherein the partial bridge 40-1 and the partial bridge 40-2 are dimensioned such that in the assembled state they form a weld bridge that has approximately the same dimensions as the other bridges 4.

In the above-mentioned exemplary embodiments the "normal" pockets 5 are preferably formed by punching. Here this punching of the pockets 5 can be effected prior to or after the laser cutting of the outer contour. However, punching prior to the laser cutting is preferred since the metal sheet still has greater stability here. For the same reason, a possible stamping and/or rolling of the bridges, which is to be discussed in more detail below, can also preferably be carried out prior to the laser cutting of the outer contour.

Figure 3:
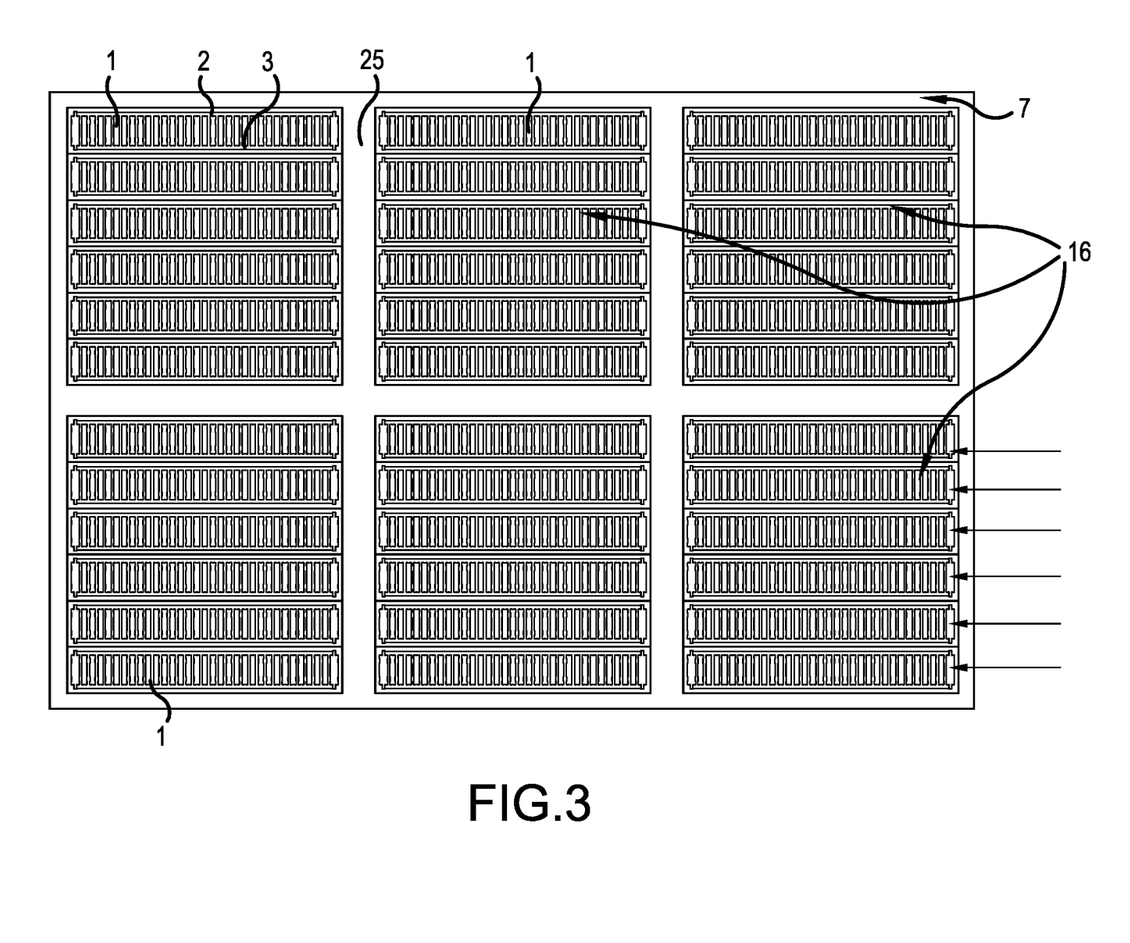
FIG. 3 is a plan view of a metal sheet including a plurality of shaped bearing cage segments.

The great advantage with combined laser cutting/punching or only with laser cutting is that, as shown by way of example in FIG. 3, the bearing cage segment can easily be cut-out from a large-area metal sheet 7. Here a plurality of bearing cage segments 1 can be obtained from the metal sheet 7 which, as shown in FIG. 3, are uniformly dimensioned. However, it is also possible that these bearing cage segments 1 differ in their dimensions.

Figure 5:
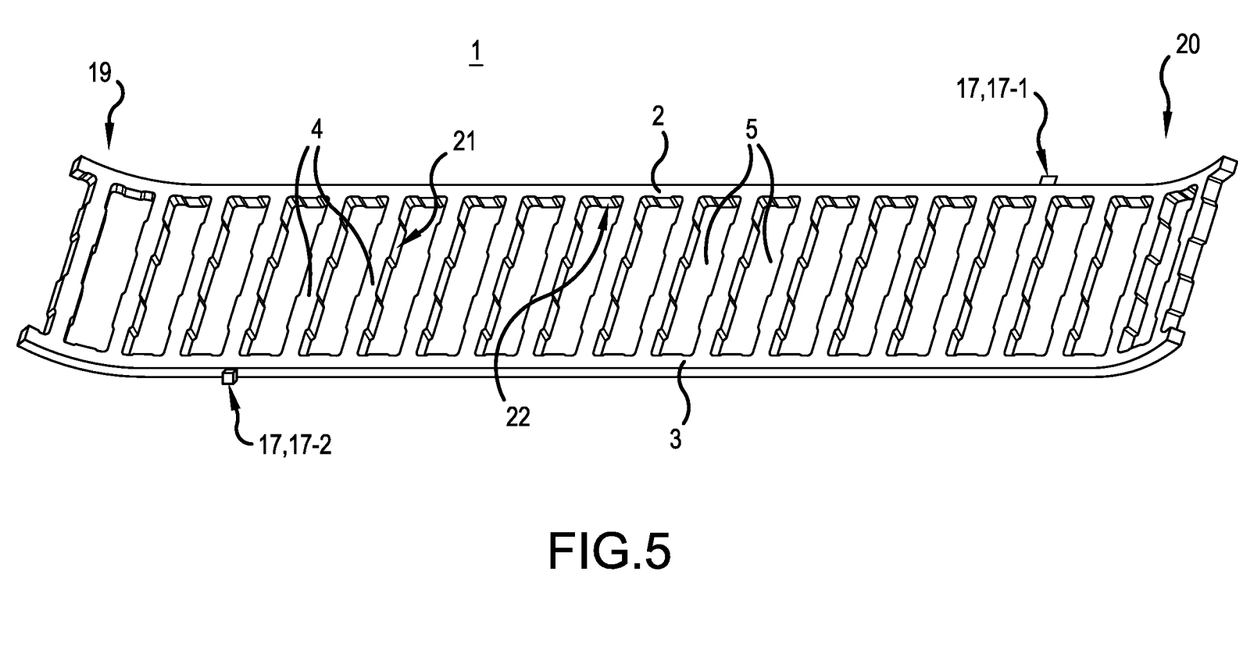
FIG. 5 is a perspective representation of a bearing cage segment having two pre-bent end regions.

In order to form a spatial fixing of the bearing cage segment 1 or of the bearing cage segments 1 for, for example, steps occurring after the laser cutting, such as punching, bending, rolling, stamping, and to improve the handleability of the bearing cage segments 1, the individual bearing cage segments 1 can, as indicated in the exemplary embodiment shown in FIG. 5 based on a bearing cage segment already separated from the metal sheet 7, preferably each be connected to the rest of the metal sheet 7 via micro-connection points. These micro-connection points 17 are only detached when the respective bearing cage segment 1 is needed. The micro-connection points 17 are preferably configured such that a detaching of the bearing cage segment from the metal sheet 7 is possible by a simple manual breaking of the micro-connection points 17. Mechanical and/or machine breaking or removing is also possible.

In order to also facilitate storing and handling or the subsequent further processing, a plurality of bearing cage segments can be grouped into a "cluster" 16, wherein stabilizing sheet metal regions 25 are formed between the clusters 16. To provide one of the bearing cage segments it can be provided that first the respective cluster 16 is completely released from the rest of the metal sheet 7, and in a subsequent step the desired bearing cage segment 1 is separated from the rest of the cluster 16.

Figure 4:
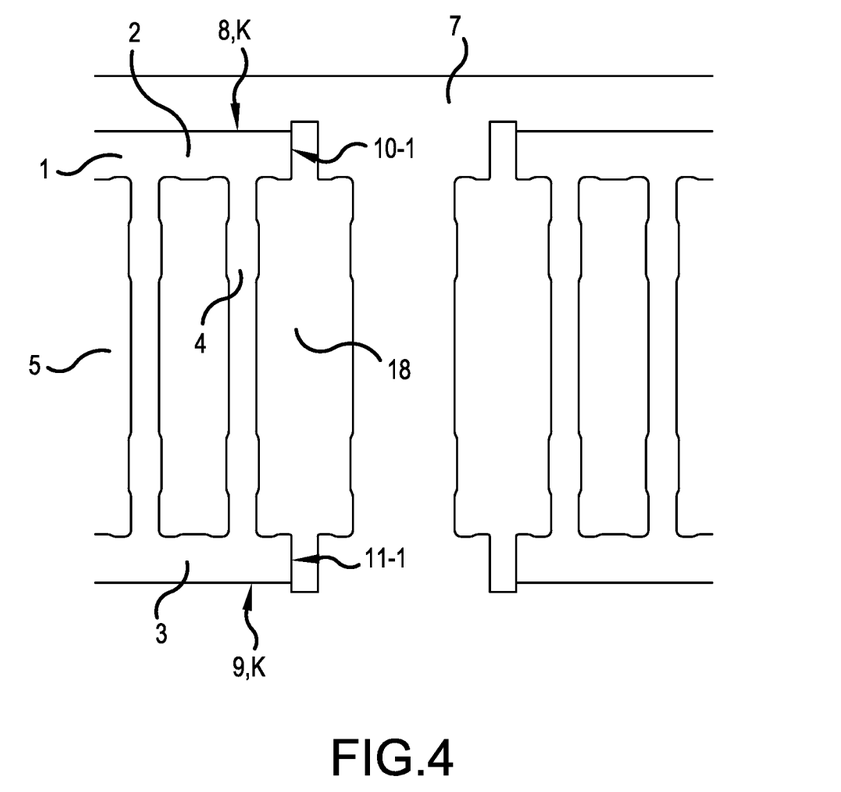
FIG. 4 is a detail of FIG. 3 about an end region of the bearing cage segment.

FIG. 4 shows a detail of FIG. 3 around an end region of the bearing cage segment according to a further exemplary embodiment. As shown, a recess 18 can be formed at the circumferential end of the bearing cage segment, here also referred to as "sacrificial pocket 18," by which a contour is formed that corresponds in its basic shape to the corresponding contour of the partial pocket 50-1 shown in FIG. 1. However, this recess 18 can be punched in accordance with an exemplary embodiment. For this purpose a corresponding punching tool can be provided. Here the recess 18 is preferably configured such that it extends axially outward over the ring sections 2, 3. The joint edges 10-1 and 11-1 of the ring sections 2 can thereby also be produced particularly flatly by punching. However, in this example the axially outer edges 8, 9 of the ring sections 2, 9 are laser-cut, wherein the laser cuts open directly into the recess 18 in order to obtain a largest-possible variability in the width of the bearing cage segment 1.

In the exemplary embodiment shown in FIG. 5, the bearing cage segment 1 includes an end region 19, 20 at each of its circumferential ends, which is pre-bent to the radius of curvature of the finished sheet metal cage. The bending of the bearing cage segment 1 overall to the provided radius of curvature is thereby made easier.

The pre-bent end regions 19, 20 can advantageously be produced by stamping, in particular while the bearing cage segment 1 is still connected to the rest of the metal sheet 7 via the micro-connection points 17-1, 17-2.

As furthermore shown by way of example in FIG. 5, guide surfaces 21 for guiding the rolling elements can be formed on the bridges 4. In the embodiment shown in FIG. 5, these guide surfaces 21 extend over the entire radial thickness of the bridges 4. Thus these guide surfaces 21 can be formed, for example, in the course of the punching of the pockets 5.

The ring sections 2, 3 can also include correspondingly formed guide surfaces 22.

In the example shown in FIG. 5, the bridges 4 have a uniform radial thickness at all points. The ring sections 2, 3 also have a uniform thickness that is identical here to the thickness of the bridges 4.

Figure 6:
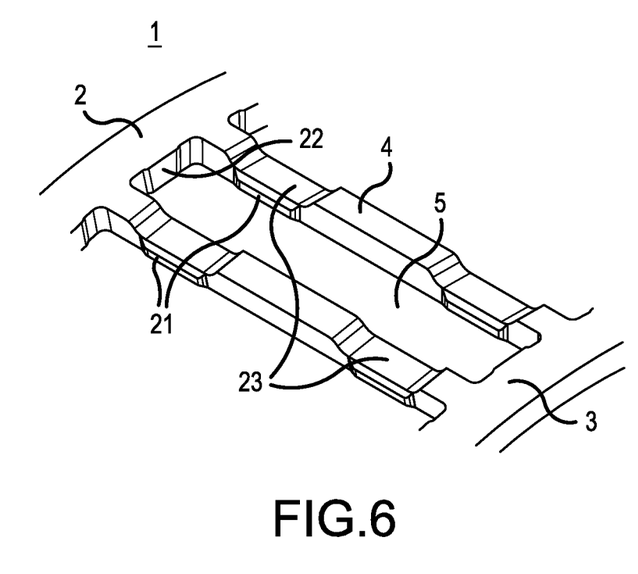
FIG. 6 is a perspective representation of a further preferred exemplary embodiment including stamped bridges.

FIG. 6 shows details of a further preferred exemplary embodiment of a bearing cage segment 1, wherein the bridges 4 do not have uniform thickness. Rather, the bridges 4 have stamped and/or rolled and/or milled regions 23 here by which regions 23 guide surfaces are formed for the rolling elements. Here the ring sections 2, 3 can include guide surfaces 22 as are described above with reference to FIG. 5.

Figure 7:
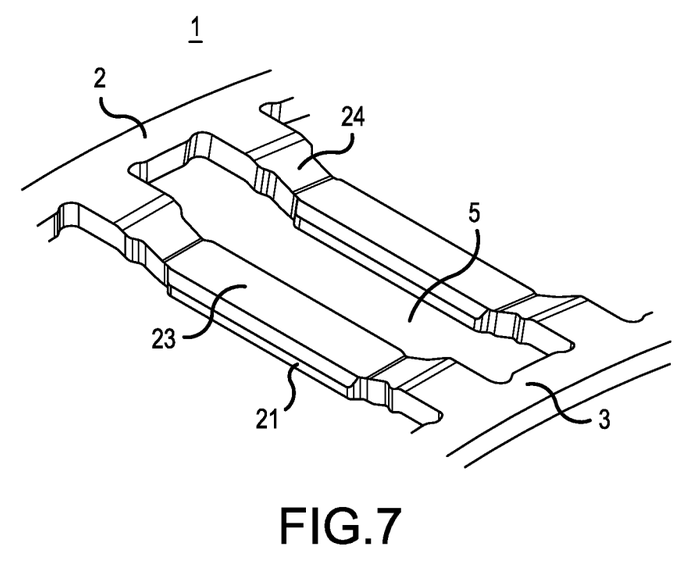
FIG. 7 is a perspective representation of a further exemplary embodiment including rolled and stamped bridges.

FIG. 7 shows a further preferred embodiment wherein the bridges include regions 23 formed by rolling and/or stamping, which regions 23 extend farther radially inward than the ring sections 2, 3. These bridge regions 23 can in turn include corresponding guide surfaces 21 for the rolling elements. The bridge regions 23 are connected to the ring sections via bridge regions 24. Alternatively the bridge regions 23 can be configured extending radially outward.

One of the following sequences can preferably be provided for the order of the steps for forming the bridges shown in FIGS. 5 and 6:

rolling/stamping-punching-laser cutting
punching-laser cutting-rolling/stamping
punching-rolling/stamping-laser cutting If the punching is carried-out prior to the laser cutting, it can be achieved that the bearing cage segment will remain particularly stably connected to the metal sheet during the punching process.

In summary a bearing cage segment can be manufactured particularly economically by the bearing cage segment being at least partially laser-cut, whereby an individual manufacturing is possible without tools that are specifically matched to the dimensions of the bearing cage segment. Due to pre-bent end regions of the bearing cage the bearing cage segment can be more easily bent out of a plane into the radius of curvature specified for the finished cage. The bearing cage segment can advantageously be manufactured from a metal sheet, wherein during manufacturing it is still connected to the rest of the metal sheet via micro-connection points.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved bearing cages.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

What is claimed is:

1. A sheet metal bearing cage segment comprising:
   a first sheet metal ring section;
   at least one second sheet metal ring section;
   a plurality of bridges connecting the first ring section and the at least one second ring section to each other, adjacent pairs of the bridges forming pockets configured to receive at least one rolling element,
   wherein at least one edge of the first ring section and/or at least one edge of the at least one second ring section and/or one of the bridges is at least partially formed by laser cutting, and
   wherein the bearing cage segment includes a first end region having a radius of curvature and a second end region having a radius of curvature spaced from the first end region by a substantially planar region.

2. The bearing cage segment according to claim 1, wherein the at least one edge comprises at least a part of an outer contour of the bearing cage segment.

3. The bearing cage segment according to claim 1, wherein the at least one pocket is formed by punching.

4. The bearing cage segment according to claim 1, wherein the at least one edge is a joint edge directed in the circumferential direction and disposed in a region of one of the pockets or in a region of one of the bridges.

5. The bearing cage segment according to claim 1, wherein at least one of the bridges and/or the first ring section and/or the at least one second ring section includes guide structures for guiding a rolling element, the structures being formed by stamping and/or rolling.

6. A method comprising:
providing a metal sheet;
punching a plurality of openings in the metal sheet;
after punching the plurality of openings, laser cutting a first path around a first subset of the plurality of openings to form an outer periphery of a first bearing cage segment, the first subset of the plurality of openings forming pockets of the first bearing cage segment.

7. The method according to claim 6,
wherein the outer periphery includes a first linear section forming an outer edge of a first ring of the bearing cage segment and a second linear section forming an outer edge of a second ring of the bearing cage segment, the second linear section being parallel to the first linear section.

8. The method according to claim 6,
including cutting a second path around a second subset of the plurality of openings to form a periphery of a second bearing cage segment, the second subset of the plurality of openings forming pockets of the second bearing cage segment.

9. The method according to claim 8,
wherein the laser cutting includes leaving the bearing cage segment attached to the metal sheet by at least one micro-connection point.

10. The method according to claim 6,
wherein the first path intersects one of the plurality of openings to form a partial pocket at a first end of the bearing cage segment.

11. The method according to claim 6,
wherein the first path intersects a first one of the plurality of openings to form a first partial pocket at a first end of the bearing cage segment and intersects a second one of the plurality of openings to form a second partial pocket at a second end of the bearing cage segment.

12. The method according to claim 6,
wherein the outer periphery is rectangular.

* * * * *